(12) United States Patent
Carlitz et al.

(10) Patent No.: US 11,267,308 B2
(45) Date of Patent: Mar. 8, 2022

(54) INDEPENDENT WHEEL SUSPENSION FOR A MOTOR VEHICLE

(71) Applicant: Ford Global Technologies, LLC, Dearborn, MI (US)

(72) Inventors: Andreas Carlitz, Stolberg (DE); Thomas Schmitz, Essen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 16/692,666

(22) Filed: Nov. 22, 2019

(65) Prior Publication Data

US 2020/0164709 A1 May 28, 2020

(30) Foreign Application Priority Data

Nov. 26, 2018 (DE) .......................... 102018220235.4

(51) Int. Cl.
| | | |
|---|---|---|
| *B60G 17/02* | (2006.01) | |
| *B60G 3/18* | (2006.01) | |
| *B60G 7/00* | (2006.01) | |
| *B60G 11/14* | (2006.01) | |
| *B60G 3/20* | (2006.01) | |

(52) U.S. Cl.
CPC ........... *B60G 17/021* (2013.01); *B60G 3/185* (2013.01); *B60G 3/207* (2013.01); *B60G 7/008* (2013.01); *B60G 11/14* (2013.01)

(58) Field of Classification Search
CPC ...... B60G 17/021; B60G 3/207; B60G 3/185; B60G 7/008; B60G 11/14; B60G 2204/124; B60G 2204/1244; B60G 2206/426; B60G 2202/12; B60G 7/02; B60G 3/02
See application file for complete search history.

(56) References Cited

U.S. PATENT DOCUMENTS 3,781,032 A * 12/1973 Jones ..................... B60G 11/14
 280/124.133
6,343,618 B1 2/2002 Britt et al.
(Continued)

FOREIGN PATENT DOCUMENTS

| DE | 102005044222 | 8/2007 |
|---|---|---|
| GB | 1482500 | 8/1977 |

OTHER PUBLICATIONS

German Patent Office, "Office Action", dated Nov. 20, 2019 in connection with application No. 10 2018 220 235.4, 11 pages.
(Continued)

*Primary Examiner* — Drew J Brown
(74) *Attorney, Agent, or Firm* — Ray Coppiellie; Hanley, Flight & Zimmerman, LLC

(57) ABSTRACT

Independent wheel suspensions for a motor vehicle are described herein. An example independent wheel suspension includes a link to be pivotably coupled to a vehicle body of the motor vehicle via a first flexible pivot bearing and a second flexible pivot bearing. The first and second flexible pivot bearings form a pivoting axis. The link has a wheel attachment point to which a vehicle wheel is to be coupled. The example independent wheel suspension also includes a spring to be disposed between the link and the vehicle body. The spring is configured to produce a force component on the link that is directed outward along a transverse axis of the motor vehicle and that increases during compression.

20 Claims, 6 Drawing Sheets

(56) References Cited

U.S. PATENT DOCUMENTS

| | | | |
|---|---|---|---|
| 7,984,915 B2 | 7/2011 | Post, II et al. | |
| 2002/0089108 A1* | 7/2002 | Imaizumi | B60G 11/14 |
| | | | 267/248 |
| 2010/0201086 A1* | 8/2010 | Sagara | B60G 7/04 |
| | | | 280/5.522 |
| 2011/0248465 A1* | 10/2011 | Carlitz | B60G 3/00 |
| | | | 280/124.164 |
| 2017/0050486 A1* | 2/2017 | Sayama | B60G 11/14 |
| 2018/0215227 A1* | 8/2018 | Okura | B60G 15/063 |
| 2019/0322149 A1* | 10/2019 | Okamoto | B60G 3/04 |

OTHER PUBLICATIONS

Carlitz, Andreas et al., "Effect of Force Vectoring Spring implementation into a Twistbeam Rear Suspension", SAE International Journal of Vehicle Dynamics, Stability, and NVH, published on Mar. 28, 2017, 6 pages.

\* cited by examiner

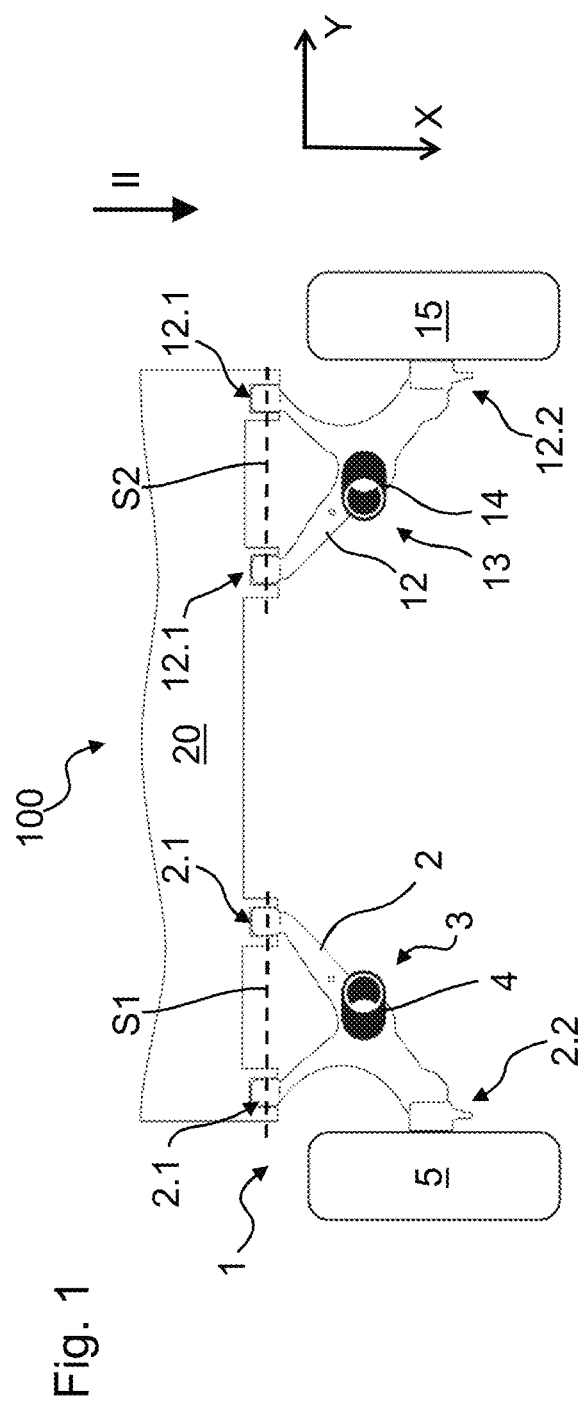
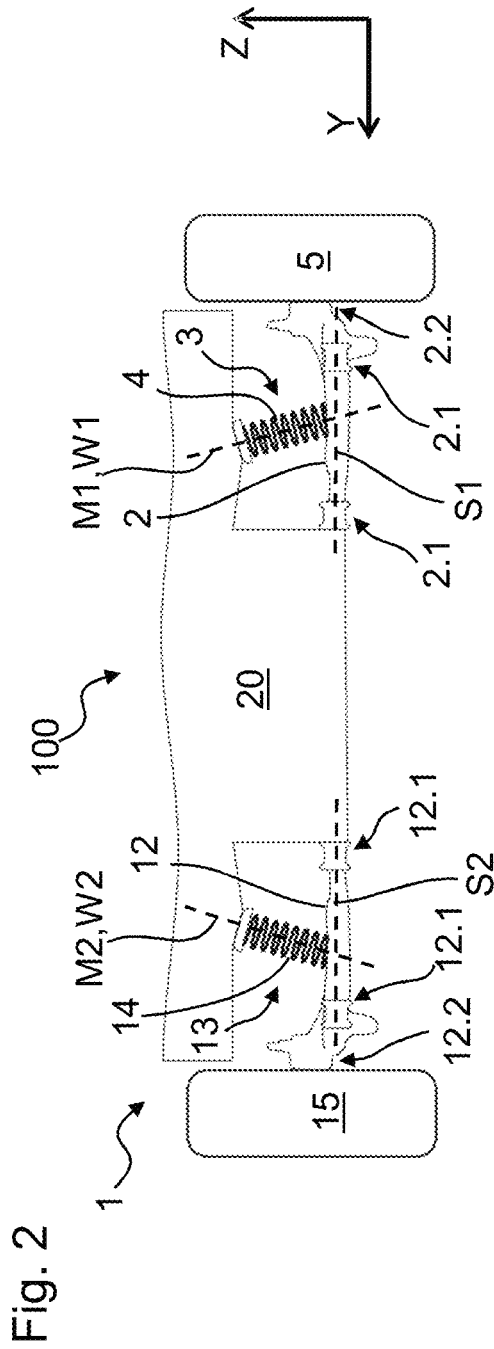
Fig. 1
Fig. 2

INDEPENDENT WHEEL SUSPENSION FOR A MOTOR VEHICLE

RELATED APPLICATION

This patent claims priority to German Patent Application DE 102018220235.4, titled "Einzelradaufhängung für ein Kraftfahrzeug," and filed Nov. 26, 2018, which is hereby incorporated by reference in its entirety.

FIELD OF THE DISCLOSURE

This disclosure relates generally to motor vehicles and, more particularly, to independent wheel suspensions for motor vehicles.

BACKGROUND

On modern motor vehicles, all of the wheels are connected to the body or the chassis of the vehicle in such a way that each of the wheels can move relative to the body. Each wheel and a wheel carrier on which the wheel is mounted are part of the unsprung mass, which, to a greater or lesser extent, follows the height of the respective driving surface, while the body and the chassis form parts of the sprung mass, which should be decoupled, at least to a large extent, from sudden movements of the unsprung mass.

SUMMARY

An independent wheel suspension for a motor vehicle is disclosed herein. The independent wheel suspension includes a link to be pivotably coupled to a vehicle body of the motor vehicle via a first flexible pivot bearing and a second flexible pivot bearing. The first and second flexible pivot bearings form a pivoting axis. The link has a wheel attachment point to which a vehicle wheel is to be coupled. The independent wheel suspension also includes a spring to be disposed between the link and the vehicle body. The is spring configured to produce a force component on the link that is directed outward along a transverse axis of the motor vehicle and that increases during compression.

A motor vehicle is disclosed herein that includes a first wheel, a second wheel, a vehicle body, and an independent wheel suspension. The independent wheel suspension includes a first link pivotably coupled to the vehicle body via a first flexible pivot bearing and a second flexible pivot bearing. The first wheel is coupled to the first link. The independent wheel suspension also includes a first spring disposed between the first link and the vehicle body. The first spring is configured to produce a first force component on the first link that is directed outward along a transverse axis of the motor vehicle. The independent wheel suspension includes a second link pivotably coupled to the vehicle body via a third flexible pivot bearing and a fourth flexible pivot bearing. The second link is pivotable independently of the first link. The second wheel is coupled to the second link. The independent wheel suspension further includes a second spring disposed between the second link and the vehicle body. The second spring is configured to produce a second force component on the second link that is directed outward along the transverse axis of the motor vehicle.

BRIEF DESCRIPTION OF THE DRAWINGS

FIG. 1 is a plan view of a first example of an independent wheel suspension implemented on an example motor vehicle and constructed in accordance with the teachings of this disclosure.

FIG. 2 is a front view of the example independent wheel suspension of FIG. 1 in straight-ahead travel.

Figure 3:
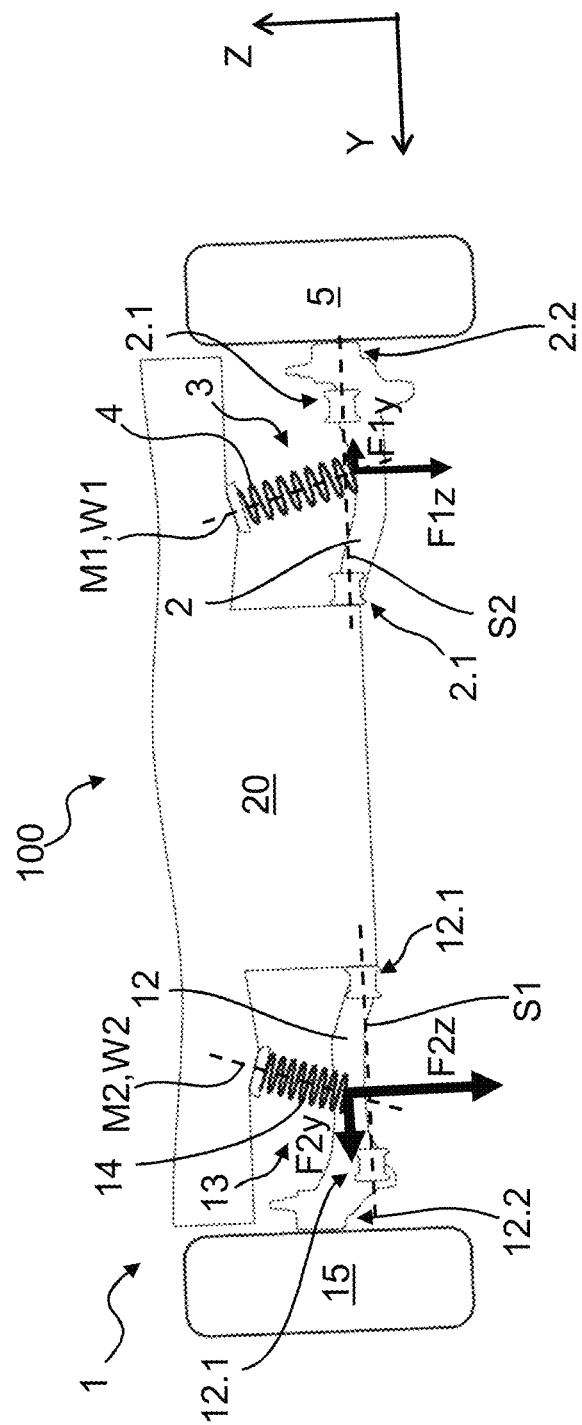
FIG. 3 is a front view of the example independent wheel suspension of FIG. 1 when cornering.

The figures are not to scale. Instead, the thickness of the layers or regions may be enlarged in the drawings. In general, the same reference numbers will be used throughout the drawing(s) and accompanying written description to refer to the same or like parts. Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In modern mobile vehicles, each of the wheels is connected to the vehicle body by one or more links in a manner that allows the links to pivot about at least one axis. Depending on requirements, different numbers of links can be used to guide the wheel. A distinction may be drawn between longitudinal links, diagonal links, and transverse links, depending on the path of the link relative to the vehicle or the longitudinal axis thereof. In one known type of suspension that is used almost exclusively for rear axles, each wheel is pivotably connected to the vehicle body individually by means of a single link, which is also referred to as a swinging arm. The respective link can be a longitudinal link, which is therefore pivotable about a pivoting axis that is parallel to the transverse axis of the vehicle. In another instance, the respective link can be a diagonal link, in which the pivoting axis is diagonal with respect to the transverse axis of the vehicle and with respect to the longitudinal axis of the vehicle. The wheel carrier is usually connected in a fixed manner to the link or even manufactured integrally therewith. The link generally has a roughly triangular structure, in which two pivot bearings for attachment to the vehicle body are provided in the front region, and the wheel carrier or attachment point for the latter are provided in the rear region.

To minimize the transmission of vibration on the part of the running gear to the vehicle body, the link is normally connected to the vehicle body by flexible pivot bearings.

Although the flexibility of the bearings suppresses the transmission of shocks and vibration in the desired manner and thus contributes overall to ride comfort, this also simultaneously impairs the guidance of the link relative to the vehicle body and thus that of the wheel. In the case of laterally acting forces, such as when cornering, the link twists relative to the vehicle body about the vertical axis of the vehicle. The vehicle thus tends to oversteer, all the more so, the softer or more flexible the design of the bearings. In principle, this problem could be counteracted by combining the longitudinal or diagonal links with transverse links, but this is problematic as regards the kinematics of the axle and, in some circumstances, may even be entirely impractical.

Disclosed herein are examples that prevent or reduce (e.g., minimize) oversteer in independent wheel suspensions that have longitudinal links or diagonal links. Thus, the example disclosed herein counteract oversteer in the case of a vehicle axle with independent wheel suspension. It should be noted that the features and measures presented individually in the following description can be combined in any technically feasible manner, giving rise to further examples.

Disclosed herein are example independent wheel suspensions for motor vehicles. A motor vehicle may be, for example, a passenger car or truck. The example wheel suspensions disclosed herein may be for a front wheel or a real wheel. In particular, the example wheel suspensions disclosed herein can be the wheel suspension for a driven or an undriven rear wheel. As used herein, the term "independent wheel suspension" means that the two wheels on an axle are suspended individually and independently of one another and, thus, can move independently of one another.

An example independent wheel suspension disclosed herein has an example link that has example flexible pivot bearings mounted on an example vehicle body in such a way as to be pivotable about a pivoting axis. The pivot bearings form means for the link to be mounted in such a way as to be pivotable relative to the vehicle body. In some examples, the link is mounted on the vehicle body in such a way as to be pivotable about a pivoting axis by two flexible pivot bearings that are offset at least relative to the Y axis. In an XYZ reference frame, the X axis corresponds to a longitudinal axis of the motor vehicle, the Y axis corresponds to an axis that is transverse to the motor vehicle (e.g., perpendicular to the longitudinal axis), and the Z axis corresponds to an axis that is perpendicular to the X and Y axes (e.g., the Z axis may be the vertical axis). Therefore, in some examples, two pivot bearings form the means for the link to be mounted in such a way as to be pivotable relative to the vehicle body. As used herein, "vehicle body" is used as a collective term for the body shell, the chassis, and, where present, a subframe. In some examples, bearing lugs or bearing sleeves that receive rubber-metal bushes or similar elements are formed on the link. In some examples, a pivot pin, which is passed through the rubber-metal bush, is provided on the vehicle body. In each case, both pivot bearings are of flexible design, the primary purpose thereof being to minimize the transmission of shocks and vibration to the vehicle body. The arrangement of the two pivot bearings relative to one another defines a pivoting axis, which normally also corresponds to the alignment of the bearing sleeves or similar elements. In some examples, the two pivot bearings are arranged offset with respect to one another in relation to the Y axis, and therefore the pivoting axis is at an angle, i.e. not parallel, to the X axis. In some examples, the pivot bearings can additionally also be arranged offset with respect to one another in relation to the X axis and/or in relation to the Z axis.

The example link has an example wheel attachment point for direct or indirect attachment of a vehicle wheel. The wheel attachment point can be used to secure a wheel carrier. In other examples, the wheel carrier is formed on the link itself. A wheel carrier or knuckle of this kind is provided for the purpose of mounting the wheel, which is thus rotatably mounted relative thereto in the installed state. The two pivot bearings and the wheel attachment point form a substantially triangular arrangement. In some examples, the link can also be referred to as an A-arm. The link can be constructed of any material and other link configurations are possible. For example, the link can be manufactured as a shell structure including sheet metal parts, the link can be manufactured from gray cast iron or light metal (e.g., aluminum), the link can be manufactured from composite material or fiber-reinforced plastic, or a combination of the aforementioned materials. The link can have a more or less sheet-like form or can have several arms, on the ends of which the pivot bearings or wheel attachment point, respectively, are arranged. Arms of this kind can be of straight, curved and/or angled design.

In some examples, the link is coupled, directly or indirectly, to the vehicle body by means of an example spring unit or element. As such, the vehicle body is supported, directly or indirectly, on the link via the spring unit. In such an example, the spring element unit provides spring support for the wheel relative to the vehicle body. The spring unit can be mounted either directly on the link or, alternatively, on a component connected thereto (e.g., a wheel carrier) if the latter is not formed integrally with the link. The spring unit is used to decouple the vehicle body (i.e., the sprung mass of the vehicle) from the unsprung mass. In the case of a vertical deflection of the wheel and thus of the link relative to the vehicle body, there is an elastic deformation of the spring unit, which leads in turn to a restoring force. The spring unit can be of single-part or multi-part design. In some examples, the spring unit is passive (i.e., it does not have any actuators or a motor drive).

In some examples, the link can be connected directly or indirectly to the vehicle body via a damper (e.g., as part of a shock absorber). The damper dampens oscillations by converting kinetic energy into heat. The damper can be combined spatially with the spring unit.

In examples disclosed herein, the spring unit is configured or designed to produce a force component on the link that is directed outward along the Y axis (a transverse axis of the motor vehicle) and increases during compression. The spring unit is therefore configured or designed to produce a force component on the link that is directed outward along the Y axis. As disclosed above, the spring unit can transmit the force component to the link directly or indirectly (e.g., via at least one interposed component). The corresponding force component acts along the Y axis, i.e., in the transverse direction, outward from the vehicle center or vehicle center plane. If compression occurs because of increasing static or dynamic loading (i.e., a vertical deflection of a vehicle wheel relative to the vehicle body), the corresponding force component increases. In the absence of compression (e.g., at normal load), the corresponding force component is zero and, thus, increases during compression, starting from zero.

During cornering, compression occurs at the wheel on the outside of the bend. At the same time, the inertia of the vehicle body leads to a tendency for the vehicle body to be pushed outward in relation to the bend, relative to the link and the wheel arranged thereon. As viewed from the vehicle body, the wheel on the outside of the bend or the link on the outside of the bend is subject to a force acting toward the center of the vehicle or a corresponding torque around the vertical axis. In known designs, this force would result in oversteer. However, in examples disclosed herein, this force is counteracted by the force component produced by the spring unit. Depending on the example or the instantaneous loading, the oversteer can be completely or partially suppressed. The example wheel suspension or spring unit are designed or set up in such a way that, when the vehicle is traveling straight ahead, alignment of the wheel parallel to the direction of travel results from the sum total of the forces acting laterally (i.e., along the Y axis) on each of the wheels or each of the links. Therefore, if the spring unit produces a lateral force component even in straight-ahead travel, the lateral force component can be compensated by bearing forces at the wheel attachment points, for example.

In some examples disclosed herein, it is advantageous that oversteer is counteracted by a purely passive spring unit. In other words, no active elements that would complicate the structure of the wheel suspension are required. The spring unit also takes at least some part in the usual function of a spring support for the link or the wheel arranged thereon relative to the vehicle body. In some examples disclosed herein, there is no need for any additional components to a standard motor vehicle, but only for modification or arrangement of components that are already present.

In some examples, the spring unit is advantageously configured in such a way that the outwardly directed force component increases monotonically as a function of a wheel load of the vehicle wheel. In other words, the greater the wheel load, the greater is the outward-directed force component. In this case, the outward-directed force component during rebound is reduced. This ensures that oversteer is likewise counteracted at the wheel on the inside of the bend, which usually rebounds. During cornering, the inertia of the vehicle body normally imposes on this wheel on the inside of the bend a force or torque that pushes the wheel outward relative to the vehicle body (i.e., away from the vehicle center). This likewise corresponds to oversteer. By virtue of the fact that the outward-directed force component produced by the spring unit is reduced as compared with straight-ahead travel, the oversteer at the wheel on the inside of the bend is also at least reduced or even prevented.

In some examples disclosed herein, the pivoting axis of the link is parallel to the Y axis (the transverse axis of the motor vehicle), wherein the link is designed as a longitudinal link. In other words, the two pivot bearings are at the same position in relation to the X axis and the Z axis and are offset with respect to one another, normally spaced apart, only along the Y axis. The link is designed as a longitudinal link and extends rearward from the pivot bearings, relative to the X axis. Normally, the wheel attachment point corresponds to the rearmost part of the link. The advantages of the example wheel suspensions disclosed herein are more impactful with this type of longitudinal link because the lateral forces (i.e., the forces acting in the direction of the Y axis) act on the link with a large effective lever arm. The at least partial compensation of such forces is therefore particularly important when cornering in order to stabilize the track of the respective wheel.

In other examples disclosed herein, the pivoting axis is at an angle relative to the Y axis (the transverse axis of the motor vehicle), wherein the link is designed as a diagonal link, sometimes referred as a semi-trailing axle. The pivoting axes of the links arranged on the two sides are symmetrical with respect to the vehicle center plane. The pivoting axes each extend diagonally with respect to the X-Y plane, i.e. neither parallel to the X axis nor parallel to the Y axis. The pivoting axis can be at any angle relative to the Y axis. In some examples, the pivoting axis is between 10° and 45° relative to the Y axis. The pivoting axis can additionally be at an angle to the X-Y plane, i.e. the two pivot bearings can additionally be offset with respect to one another in relation to the Z axis, i.e. they can have a vertical offset. In other words, the projection of the respective pivoting axis on the X-Y plane is at an angle to the X axis and to the Y axis.

In some examples disclosed herein, the spring unit includes a spring. The spring has a line of action that slopes inward toward the Y axis relative to the Z axis. As such, the line of action of force corresponds to the effective path of the force produced by the spring. If the line of action of force slopes inward toward the Y axis relative to the Z axis, i.e., the line of action of force extends inward (i.e., toward the vehicle center) when viewed from the bottom up, the spring produces a vertical force component that serves to support the vehicle body, and a horizontal force component, namely the outward-directed force component. Both force components increase during compression. Depending on requirements, the magnitude of the selected slope of the line of action of force relative to the Z axis can differ. In some examples, the magnitude of the slope is below 45°, such that the vertical force component is larger than the outward-directed force component.

The spring can be supported on a wheel carrier manufactured separately from the link, for example. In some examples, it is advantageous that the spring is supported on the link. The spring may be supported on an upper side of the link, such as via a spring plate or some other suitable element, by means of which a secure connection between the spring and the link is achieved. In some examples, the spring is mounted in an articulated manner on the link, thus allowing a certain pivoting movement.

The slope of the line of action of force disclosed herein is achieved in various manners. In one example, the spring is disposed such that a center line of the spring is sloped inward toward the Y axis relative to the Z axis. In the case of a cylindrical coil spring, the center line or spring center line corresponds to the cylinder axis. In the case of non-cylindrical springs, such as those in which the individual turns that have different diameters and/or are offset with respect to one another, for example, a type of central point of each individual turn is normally constructed and the central points are connected by an imaginary line, which then forms the center line. However, the examples disclosed herein are not limited to coil springs. Instead, other types of spring (e.g., pneumatic springs) can also be employed.

Additionally or alternatively, the line of action of force of the spring slopes inward toward the Y axis relative to the center line of the spring. In other words, the line of action of force is tilted or slopes in the Y-Z plane relative to the center line. The projection of the line of action of force onto the Y-Z plane is at an angle to the projection of the center line. Mathematically, this can also be interpreted as a rotation around the X axis. In this example, the slope of the line of action of force is not achieved (or at least not exclusively achieved) by a slope of the spring but by the design of the spring. Springs of this kind are also referred to as force vectoring springs. While the center line thereof may be curved in the unloaded state, springs of this kind are normally designed in such a way that they can also produce a straight center line under normal load in the installed state. In this state, the external dimensions can correspond at least substantially to a conventional spring, in which the line of action of force coincides with the center line. A force vectoring spring of this kind can be installed in such a way that the center line thereof is parallel to the Z axis (i.e., a slope of the spring overall is unnecessary). In some examples, this is advantageous for the overall size of the wheel suspension. Often, there are limits to the installation of a sloping spring for design reasons, and these limits therefore also exist in respect of the influencing of the outward-directed force component. With the differing line of action of force described, these limits can be overcome. Therefore, the examples disclosed herein can produce an outward-directed force component and also adapt to different variants of a vehicle model without changing the installation position or dimensioning of the spring. For this purpose, all that would be required would be to use a spring with a different line of action of force.

The example spring can be implemented in different forms of construction, such as a pneumatic spring. In some examples, the spring is designed as a coil spring. Some such coil springs include spring steel or fiber composite plastic. A coil spring in which the line of action of force and the center line coincide is normally straight and cylindrical in the relaxed state. In other examples, other designs may be used, such as a coil spring in which the radius of curvature of the individual turns varies, for example, or, alternatively, the center line is curved in the relaxed state.

In some examples disclosed herein, the spring is S-shaped in the relaxed state. This refers to the shape of the spring or of the center line thereof in the relaxed state. Springs of this kind are normally straight in the extended or compressed state. However, in the extended state the spring has a line of action of force that does not coincide with the center line but is at an angle to said line. A similar effect can also be achieved with pneumatic springs having a rolling bellows composed of a fiber-rubber composite. In this case, a line of action of force at an angle to the geometric center line of the pneumatic spring is achieved through the asymmetric configuration of the rolling bellows.

Now turning to the figures, FIG. 1 illustrates an example independent wheel suspension 1 implemented on an example motor vehicle 100 (e.g., a car). The plane of the drawing in FIG. 1 corresponds to the X-Y plane of the motor vehicle 100. The motor vehicle 100 includes first and second wheels 5, 15 that are each connected to a vehicle body 20 by respective first and second links 2, 12. In this example, the first and second wheels 5, 15 are rear wheels. However, in other examples, the example independent wheel suspension 1 can similarly be implemented in connection with front wheels. In the illustrated example, the first link 2 has first and second pivot bearings 2.1 in a front region that define a first pivoting axis $S_1$. Similarly, the second link 12 has third and fourth pivot bearings 12.1 in a front region that define a second pivoting axis $S_2$. Each of the pivot bearings 2.1, 12.1 is a flexible bearing (e.g., constructed by a rubber-metal bush), which is mounted in a bearing sleeve formed on the link 2, 12. The two pivot bearings 2.1, 12.1 of each of the links 2, 12 are offset with respect to one another, parallel to the Y axis, as a result of which the respective pivoting axis $S_1$, $S_2$ is also parallel to the Y axis.

Each of the wheels 5, 15 is guided by means of a wheel carrier, which, in this example, is formed integrally with the respective links 2, 12 at respective first and second wheel attachment points 2.2, 12.2. Each of the links 2, 12 is provided with spring support relative to the vehicle body 20 by respective first and second passive spring units 3, 13. In this example, the first spring unit 3 is formed by a first spring 4, and the second spring unit 13 is formed by a second spring 14. The first spring 4 is disposed between the first link 2 and the vehicle body 20, and the second spring 14 is disposed between the second link 12 and the vehicle body 20. In this examples, the first and second springs 4, 14 are coil springs. As can be seen particularly in the front view of FIG. 2, the first and second springs 4, 14 are not parallel to the Z axis. Instead, a first center line $M_1$ of the first spring 4 slopes inward toward the Y axis, i.e. toward the vehicle center. Similarly, a second center line $M_2$ of the second spring 14 slopes inward toward the Y axis, i.e. toward the vehicle center. In this example, each of the springs 4, 14 is a conventional, uniform coil spring. A first line of action of force $W_1$ of the first spring 4 coincides with (i.e., is aligned with) the first center line $M_1$ and likewise slopes relative to the Z axis. Similarly, a second line of action of force $W_2$ of the second spring 14 coincides with (i.e., is aligned with) the second center line $M_2$ and likewise slopes relative to the Z axis.

FIG. 2 corresponds to a state of the motor vehicle 100 under normal load and in straight-ahead travel. Both of the springs 4, 14 are subject to the same loads. FIG. 3 is a front view corresponding to FIG. 2 but in which the motor vehicle 100 is cornering. As a result, the second wheel 15 on the outside of the bend is subject to higher loads than the first wheel 5 on the inside of the bend. In corresponding fashion, a larger vertical force component $F_{2z}$ acts within the second spring 14 on the outside of the bend than in the first spring 4 on the inside of the bend. Because the spring force acts parallel to the respective line of action of force $W_1$, $W_2$ and, thus, to the center line $M_1$, $M_2$, the slope of the springs 4, 14 results in a smaller first vertical force component $F_{1z}$ in the first spring 4 on the inside of the bend. Further, a first force component $F_{1y}$ directed outward parallel to the Y axis is smaller in the case of the first spring 4 on the inside of the bend than the corresponding second force component $F_{2y}$ in the second spring 14 on the outside of the bend.

The larger outward-directed second force component $F_{2y}$ in the second spring 14 on the outside of the bend produces a torque on the second link 12 that tends to turn the second link 12 outward, as it were out of the bend. Therefore, the second spring 14 is configured to produce a force component on the second link 12 that is directed outward along a transverse axis (the Y axis) of the motor vehicle 100 and that increases during compression. The outward-directed second force component $F_{2y}$ therefore compensates fully or partially for an opposite force component that results from the inertia of the vehicle body 20 and from the friction of the second wheel 15 on the driving surface during cornering. Thus, oversteer is at least partially reduced or prevented.

Likewise, the first spring 4 on the inside of the bend is relaxed in comparison with straight-ahead travel, with the result that there the outward-directed first force component $F_{1y}$ decreases in comparison with straight-ahead travel. Because of other forces produced in the first and second pivot bearings 2.1, the first link 2 on the inside of the bend is also subject to a torque that counteracts oversteer. However, if the motor vehicle 100 were to turn in the other direction, the outward-directed first force component $F_{1y}$ would increase to counteract oversteer. Therefore, the first spring 14 is also configured to produce a force component on the first link 2 that is directed outward along a transverse axis (the Y axis) of the motor vehicle 100 and that increases during compression. With the construction shown, it is thus possible at least to limit, or prevent, oversteer, even if the pivot bearings 2.1, 12.1 have a relatively high flexibility, in order to enhance ride comfort for instance In some examples, each of the links 2, 12 is connected to the vehicle body 20 by a shock damper. In the illustrated example, the two links 2, 12 are not connected by a stabilizer, transverse link, or twist beam. However, in other examples, the two links 2, 12 can be connected to one another by a stabilizer, by means of which rolling movements of the vehicle body 20 are limited. In such an example, the stabilizer would be non-rigidly coupled to the links 2, 12.

Figure 4:
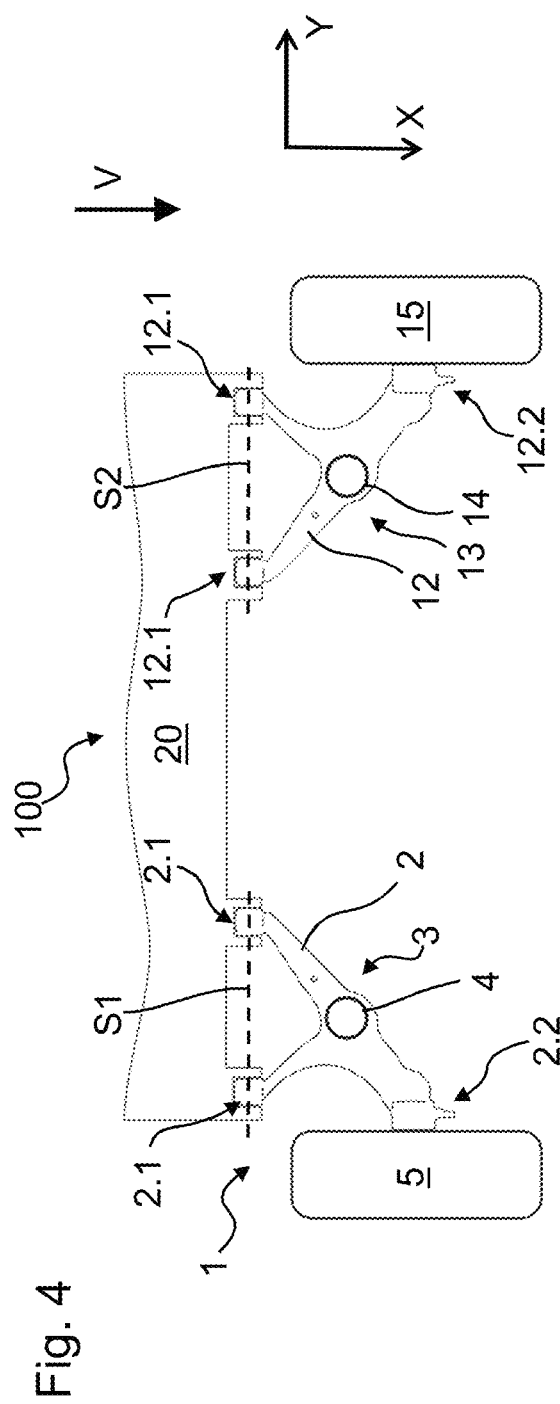
FIG. 4 is a plan view of a second example of an independent wheel suspension implemented on an example motor vehicle and constructed in accordance with the teachings of this disclosure.
Figure 5:
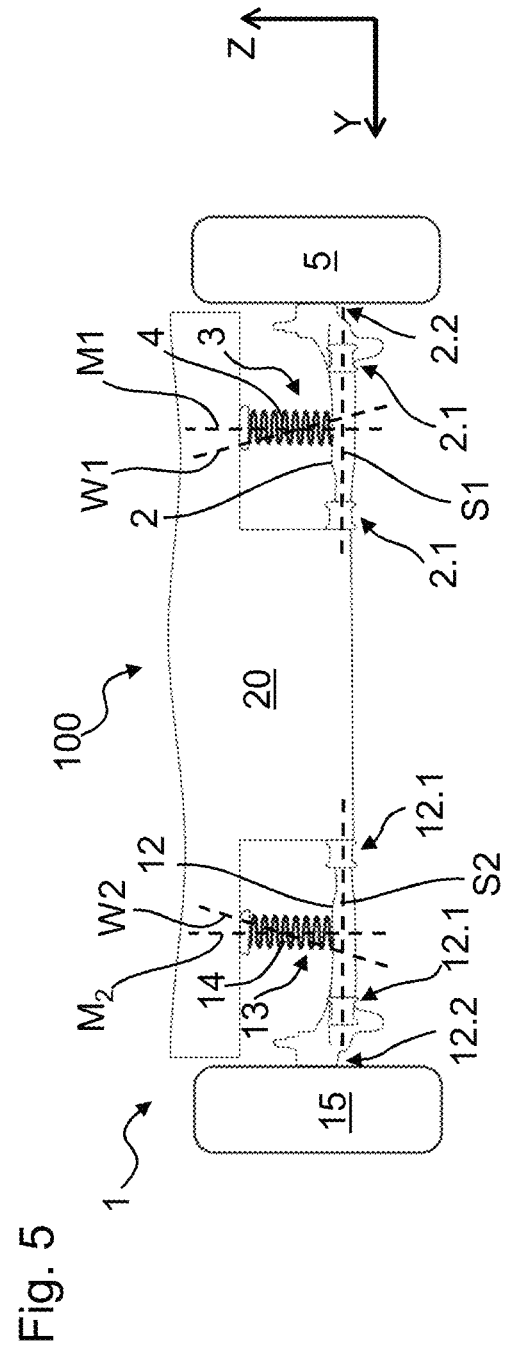
FIG. 5 is a front view of the example independent wheel suspension of FIG. 4 in straight-ahead travel.
Figure 6:
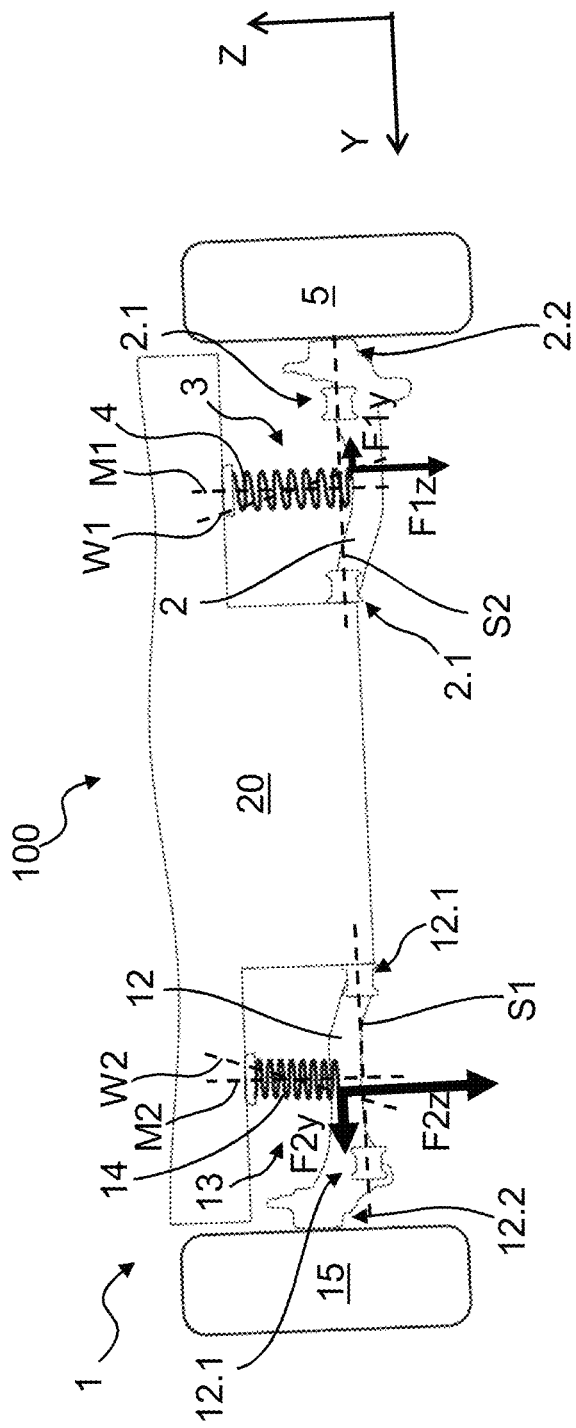
FIG. 6 is a front view of the example independent wheel suspension of FIG. 4 when cornering.
Figure 7:
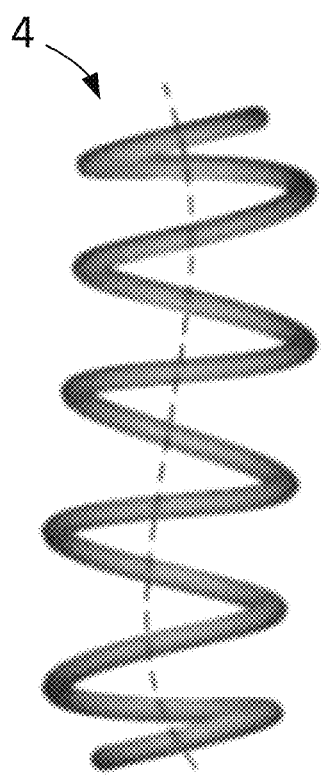
FIG. 7 illustrates an example force vectoring spring in a relaxed state.

FIGS. 4-6 illustrate a second example of an independent wheel suspension 1 implemented in connection with a motor vehicle 100. The views and parts shown in FIGS. 4-6 correspond largely to the first example shown in FIGS. 1-3 and to this extent are not explained again. In this example, however, use is made of coil springs 4, 14, with which the lines of action of force $W_1$, $W_2$ slopes inward toward the Y axis relative to the center lines $M_1$, $M_2$. However, the respective springs 4, 14 and the respective center lines $M_1$, $M_2$ thereof are aligned vertically, i.e. parallel to the Z axis. In this example, the lines of action of force $W_1$, $W_2$, which deviate from the center lines $M_1$, $M_2$, are achieved through the respective springs 4, 14 being S-shaped in the relaxed state. FIG. 7 illustrates the first spring 4, which, in this example, is S-shaped in the relaxed state. In the installed state, in which the springs 4, 14 are aligned in a straight line, an asymmetric force distribution is thereby obtained within the springs 4, 14, leading to the illustrated slope of the lines of action of force $W_1$, $W_2$. As can be seen from a comparison of FIG. 6, which once again illustrates cornering, with FIG. 3, an outward-directed force component $F_{1y}$, $F_{2y}$, which is smaller at the first wheel 5 on the inside of the bend than at the second wheel 15 on the outside of the bend, is produced in this example too. Therefore, oversteer can at least be reduced or prevented. In the example shown in FIGS. 4-6, it is advantageous that it is not necessary to set the springs 4, 14 at an oblique angle, and therefore the springs 4, 14 can be integrated much more easily into the overall wheel suspension 1. It is possible to produce or vary the outward-directed force component $F_{1y}$, $F_{2y}$ without having to adapt the external dimensions or installation position of the spring 4, 14.

Figure 8:
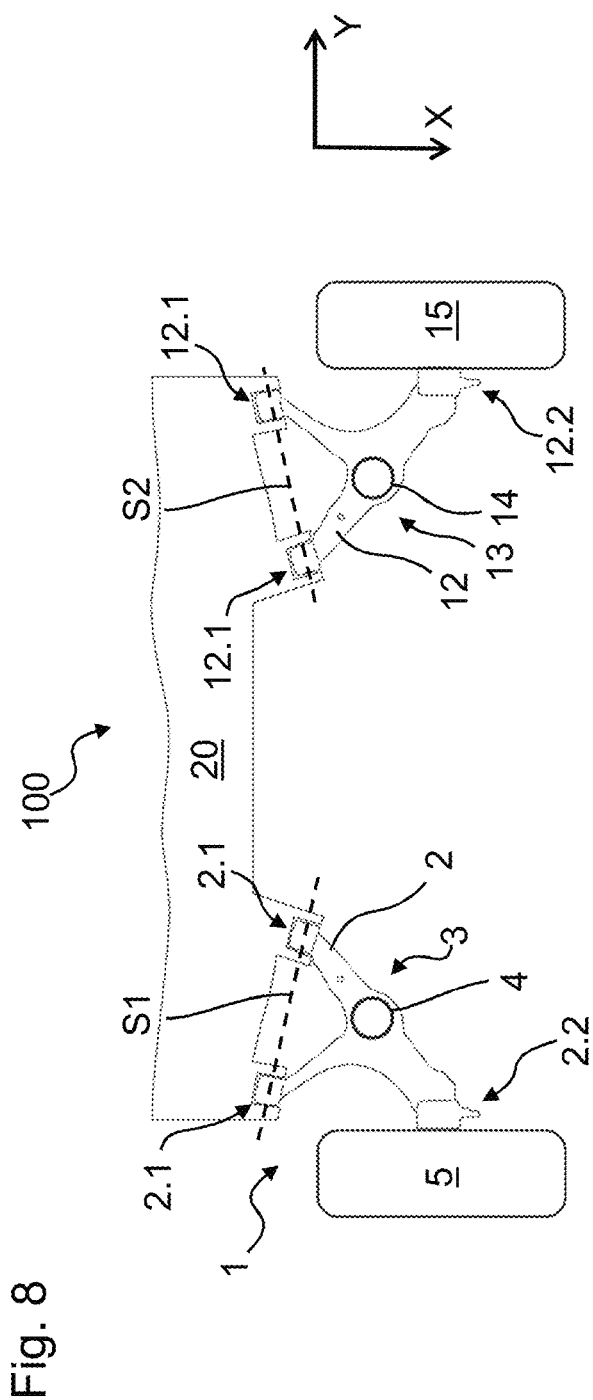
FIG. 8 is a plan view of a third example of an independent wheel suspension implemented on an example motor vehicle and constructed in accordance with the teachings of this disclosure.

FIG. 8 shows, in a plan view corresponding to FIG. 1 and FIG. 4, a third example of a wheel suspension 1 implemented in connection with a motor vehicle 100. The example of FIG. 8 is largely the same as the example shown in FIGS. 4-6, which includes use of s-shaped springs 4, 14. However, in this example, the links 2, 12 are designed as diagonal links. As such, the pivot bearings 2.1, 12.1 of the respective links 2, 12 are arranged offset with respect to one another not only in the Y direction but also in the X direction. Thus, the respective pivoting axes $S_1$, $S_2$ extends diagonally within the X-Y plane. In the example shown in FIG. 8, as in FIGS. 4-6, the springs 4, 14 are aligned vertically, but the lines of action of force $W_1$, $W_2$ slope inward relative to the center lines $M_1$, $M_2$. Alternatively, conventional coil springs (such as used in the example of FIGS. 1-3) that are sloped inward could be used.

Example apparatus, systems, and articles for reducing or preventing oversteer are disclosed herein. Further examples and combinations thereof include the following:

Example 1 an independent wheel suspension for a motor vehicle. The independent wheel suspension includes a link to be pivotably coupled to a vehicle body of the motor vehicle via a first flexible pivot bearing and a second flexible pivot bearing. The first and second flexible pivot bearings form a pivoting axis. The link has a wheel attachment point to which a vehicle wheel is to be coupled. The independent wheel suspension also includes a spring to be disposed between the link and the vehicle body. The spring is configured to produce a force component on the link that is directed outward along a transverse axis of the motor vehicle and that increases during compression.

Example 2 includes the independent wheel suspension of Example 1, wherein the spring is configured in such a way that the force component increases monotonically as a function of a wheel load of the vehicle wheel.

Example 3 includes the independent wheel suspension of Examples 1 or 2, wherein the pivoting axis is parallel to the transverse axis.

Example 4 includes the independent wheel suspension of Examples 1 or 2, wherein the pivoting axis is at an angle relative to the transverse axis.

Example 5 includes the independent wheel suspension of any of Examples 1-4, wherein a line of action of force of the spring slopes inward toward the transverse axis relative to a vertical axis.

Example 6 includes the independent wheel suspension of Example 5, wherein a center line of the spring is aligned with the line of action of force and slopes inward toward the transverse axis relative to the vertical axis.

Example 7 includes the independent wheel suspension of Example 5, wherein the spring is S-shaped in a relaxed state.

Example 8 includes the independent wheel suspension of Example 7, wherein the line of action of force of the spring slopes inward toward the transverse axis relative to a center line of the spring.

Example 9 includes the independent wheel suspension of any of claims 1-8, wherein the spring is a coil spring.

Example 10 includes the independent wheel suspension of any of Examples 1-9, wherein the spring is supported on the link.

Example 11 includes the independent wheel suspension of any of Examples 1-10, wherein the spring passive.

Example 12 includes a motor vehicle including a first wheel, a second wheel, a vehicle body, and an independent wheel suspension. The independent wheel suspension includes a first link pivotably coupled to the vehicle body via a first flexible pivot bearing and a second flexible pivot bearing. The first wheel is coupled to the first link. The independent wheel suspension also includes a first spring disposed between the first link and the vehicle body. The first spring is configured to produce a first force component on the first link that is directed outward along a transverse axis of the motor vehicle. The independent wheel suspension includes a second link pivotably coupled to the vehicle body via a third flexible pivot bearing and a fourth flexible pivot bearing. The second link is pivotable independently of the first link. The second wheel is coupled to the second link. The independent wheel suspension further includes a second spring disposed between the second link and the vehicle body. The second spring is configured to produce a second force component on the second link that is directed outward along the transverse axis of the motor vehicle.

Example 13 includes the motor vehicle of Example 12, wherein the first and second flexible pivot bearings form a first pivoting axis and the third and fourth flexible pivot bearings form a second pivoting axis that is aligned with the first pivoting axis.

Example 14 includes the motor vehicle of Example 13, wherein the first and second pivoting axes are parallel to the transverse axis of the motor vehicle.

Example 15 includes the motor vehicle of Example 12, wherein the first and second flexible pivot bearings form a first pivoting axis that is an angle relative to the transverse axis, and the third and fourth flexible pivot bearings form a second pivoting axis that is at an angle relative to the transverse axis.

Example 16 includes the motor vehicle of any of Examples 12-15, wherein a first line of action of force of the first spring and a second line of action of force of the second spring slope inward toward the transverse axis relative to a vertical axis.

Example 17 includes the motor vehicle of Example 16, wherein a first center line of the first spring is aligned with the first line of action of force, and the second center line of the second spring is aligned with the second line of action of force.

Example 18 includes the motor vehicle of Example 16, wherein the first spring is S-shaped in a relaxed state and the second spring is S-shaped in a relaxed state.

Example 19 includes the motor vehicle of Example 16, wherein the first line of action of force of the first spring slopes inward toward the transverse axis relative to a first center line of the first spring, and wherein the second line of action of force of the second spring slopes inward toward the transverse axis relative to a second center line of the second spring.

Example 20 includes the motor vehicle of any of Examples 12-19, wherein the first and second links are not connected by a twist beam.

Example 21 includes an independent wheel suspension for a motor vehicle. The example independent wheel suspension has a link that has flexible pivot bearings that are mounted on a vehicle body in such a way as to be pivotable about a pivoting axis, which has a wheel attachment point for the at least indirect attachment of a vehicle wheel and which is connected at least indirectly to the vehicle body by means of a passive spring unit. The spring unit is designed to produce a force component on the link that is directed outward along the Y axis and increases during compression.

Example 22 includes the independent wheel suspension of Example 21, wherein the spring unit is configured in such a way that the outwardly directed force component increases monotonically as a function of a wheel load of the vehicle wheel.

Example 23 includes the independent wheel suspension of Example 21 or 22, wherein the pivoting axis is parallel to the Y axis, and wherein the link is designed as a longitudinal link.

Example 24 includes the independent wheel suspension of Example 21 or 22, wherein the pivoting axis is at an angle to the Y axis, wherein the link is designed as a diagonal link.

Example 25 includes the independent wheel suspension of any of Examples 21-24, wherein the spring unit has a spring, the line of action of force of which slopes inward toward the Y axis relative to the Z axis.

Example 26 includes the independent wheel suspension of any of Examples 21-25, wherein the spring is supported on the link.

Example 27 includes the independent wheel suspension of any of Examples 21-26, wherein a center line of the spring slopes inward toward the Y axis relative to the Z axis.

Example 28 includes the independent wheel suspension of any of Examples 21-27, wherein the line of action of force of the spring slopes inward toward the Y axis relative to the center line of the spring.

Example 29 includes the independent wheel suspension of any of Examples 21-28, wherein the spring is designed as a coil spring.

Example 30 includes the independent wheel suspension of any of Examples 21-29, wherein the spring is S-shaped in the relaxed state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An independent wheel suspension for a motor vehicle, the independent wheel suspension comprising:
    a link to be pivotably coupled to a vehicle body of the motor vehicle via a first flexible pivot bearing and a second flexible pivot bearing, the first and second flexible pivot bearings forming a pivoting axis, the pivoting axis being parallel to a transverse axis of the motor vehicle, the link having a wheel attachment point to which a vehicle wheel is to be coupled; and
    a spring to be disposed between the link and the vehicle body, the spring configured to produce a force component on the link that is directed outward along the transverse axis of the motor vehicle.

2. The independent wheel suspension of claim 1, wherein the pivoting axis is at an angle relative to the transverse axis.

3. The independent wheel suspension of claim 1, wherein a line of action of force of the spring slopes inward toward the transverse axis relative to a vertical axis.

4. The independent wheel suspension of claim 3, wherein a center line of the spring is aligned with the line of action of force and slopes inward toward the transverse axis relative to the vertical axis.

5. The independent wheel suspension of claim 3, wherein the spring is S-shaped in a relaxed state.

6. The independent wheel suspension of claim 5, wherein the line of action of force of the spring slopes inward toward the transverse axis relative to a center line of the spring.

7. The independent wheel suspension of claim 6, wherein the spring is a coil spring.

8. The independent wheel suspension of claim 1, wherein the spring is supported on the link.

9. The independent wheel suspension of claim 1, wherein the spring is passive.

10. The independent wheel suspension of claim 1, wherein the spring is supported an upper side of the link by a spring plate.

11. The independent wheel suspension of claim 1, wherein the link is not connected to a twist beam.

12. A motor vehicle comprising:
    a first wheel;
    a second wheel a vehicle body; and
    an independent wheel suspension including:
        a first link pivotably coupled to the vehicle body via a first flexible pivot bearing and a second flexible pivot bearing, the first wheel coupled to the first link, the first and second flexible pivot bearings form a first pivoting axis;
        a first spring disposed between the first link and the vehicle body, the first spring configured to produce a first force component on the first link that is directed outward along a transverse axis of the motor vehicle;
        a second link pivotably coupled to the vehicle body via a third flexible pivot bearing and a fourth flexible pivot bearing, the second link pivotable independently of the first link, the second wheel coupled to the second link, the third and fourth flexible pivot bearings form a second pivoting axis that is aligned with the first pivoting axis; and a second spring disposed between the second link and the vehicle body, the second spring configured to produce a second force component on the second link that is directed outward along the transverse axis of the motor vehicle.

13. The motor vehicle of claim 12, wherein the first and second pivoting axes are parallel to the transverse axis of the motor vehicle.

14. The motor vehicle of claim 12, wherein a first line of action of force of the first spring and a second line of action of force of the second spring slopes inward toward the transverse axis relative to a vertical axis.

15. The motor vehicle of claim 14, wherein a first center line of the first spring is aligned with the first line of action of force, and a second center line of the second spring is aligned with the second line of action of force.

16. The motor vehicle of claim 14, wherein the first spring is S-shaped in a relaxed state and the second spring is S-shaped in a relaxed state.

17. The motor vehicle of claim 14, wherein the first line of action of force of the first spring slopes inward toward the transverse axis relative to a first center line of the first spring, and wherein the second line of action of force of the second spring slopes inward toward the transverse axis relative to a second center line of the second spring.

18. The motor vehicle of claim 12, wherein the first and second links are not connected by a twist beam.

19. The motor vehicle of claim 12, wherein the first and second springs are coil springs.

20. The motor vehicle of claim 12, wherein the first and second springs are passive.

* * * * *